United States Patent [19]

McBride

[11] 4,010,029
[45] Mar. 1, 1977

[54] METHOD FOR INCREASING THE USE OF SCRAP AND IRON OXIDES BY BASIC OXYGEN FURNACE

[75] Inventor: David L. McBride, Pittsburgh, Pa.

[73] Assignee: Energy and Materials Conservation Corporation, Pittsburgh, Pa.

[22] Filed: Nov. 14, 1975

[21] Appl. No.: 632,071

[52] U.S. Cl. .................................. 75/60; 75/46
[51] Int. Cl.$^2$ .................................. C21C 5/28
[58] Field of Search ................ 75/60, 43, 46

[56] References Cited
UNITED STATES PATENTS 3,323,907  6/1967  Kurzinski ................ 75/60

*Primary Examiner*—Peter D. Rosenberg
*Attorney, Agent, or Firm*—James J. Brown

[57] ABSTRACT

A process is disclosed for increasing the relative proportion of scrap steel and iron oxides used in making steel by the basic oxygen method. Molten pig iron, used in the process is superheated prior to being introduced into the basic oxygen furnace. Typically the temperature of the pig iron is raised at least 100° F or to about 2600° to 3000° F. In a particularly preferred embodiment, an induction heater is used to superheat the molten pig iron.

5 Claims, No Drawings

METHOD FOR INCREASING THE USE OF SCRAP AND IRON OXIDES BY BASIC OXYGEN FURNACE

This invention relates to basic oxygen steelmaking and specifically to a process for superheating molten pig iron prior to charging it into the refining vessel and thereby establishing the thermal conditions required for maximizing the use of scrap or iron oxide materials in the charge mix.

BACKGROUND OF THE INVENTION

The principle metallic components charged into basic oxygen furnaces, usually encompassing more than 95 percent of the total metallic charge, are molten pig iron (hot metal) and steel scrap. The temperature, composition, and quantity of hot metal available to the basic oxygen melt shop, however, rigidly governs the amount of scrap that can be melted and thereby determines the amount of raw steel produced. This limitation on the basic oxygen furnace is imposed by the thermochemistry of the process in which the heat available to melt scrap is provided by the sensible heat of the hot metal plus the heat released by the oxidation of iron, carbon, silicon, manganese, and phosphorus during the injection of a stream of high purity oxygen into the molten bath.

With the composition and temperature of hot metal commonly used in basic oxygen furnaces, the charge mixture is thermally balanced with a mix of 70 percent molten pig iron and 30 percent scrap. Unfortunately, this charge mix approximates the amount of steel scrap generated by primary and finishing rolling mills and thereby rigidly restricts total raw steel production to an amount determined by the 70 percent molten pig iron charge. The average charge mixture for basic oxygen furnaces is 1625 lb. of hot metal and 675 lb. of scrap per ton of raw steel produced.

Operators of basic oxygen furnaces have attempted to increase the scrap melting capability of the process by preheating the scrap charge with fossil fuels, both within and exterior to the vessel, or by adding powerful manufactured fuels such as calcium carbide, silicon carbide, or 50% ferrosilicon.

Typical of some of the procedures which have been employed in the prior art are the following more recent U.S. Patents:

U.S. Pat. No. 3,535,106 to D'Entremont discloses a process whereby scrap is preheated using natural gas and air and then charged into a basic oxygen vessel charged with solid fuels.

U.S. Pat. No. 3,514,279 to Jensen describes a method for preheating scrap prior to charging the scrap into an electric arc steelmaking furnace.

U.S. Pat. No. 3,399,992 to Ciochetto is concerned with using a plurality of furnaces in which scrap is preheated to 1400°–1500° F. prior to charging the scrap into a basic oxygen furnace. This process permits only a modest increase in the amount of scrap used and requires the use of fossil fuels.

U.S. Pat. No. 3,223,521 to Stone describes a device for preheating scrap to about 2000° F. without excessive oxidation of the scrap during heating and subsequent charging of the preheated scrap to a basic oxygen furnace.

U.S. Pat. No. 3,180,724 to Brooke discloses using a chamber in which cold metallic materials such as scrap, briquettes, sponge are preheated prior to being transferred into a conventional melting and refining furnace.

These procedures of the prior art, however, all involve fundamental inefficiencies and do not permit significant increases in the relative amount of scrap which can be employed in the basic oxygen process.

For example, by the addition of roughly 20 lbs. of calcium carbide, silicon carbide, or 50% ferrosilicon the charge mixture can be altered to melt an additional 150 lbs. of scrap and thereby displace a nearly equal amount of hot metal. However, the use of such supplementary fuels, also, increases the consumption of oxygen, burnt lime and dolomite (except for calcium carbide which essentially equally displaces burnt lime), fluorspar, and measurably lengthens the time to produce a batch of steel.

Further, the alternative for increasing scrap consumption by preheating the scrap within the vessel substantially increases the consumption of oxygen, inefficiently consumes fossil fuels, and severely lengthens the time required for processing. In addition, because of the low specific heat of solid steel, (0.145 Btu/lb/° F) it is necessary to preheat the entire scrap charge to roughly 800° F to accomplish an increase of 100 lb. of scrap in the charge mixture. Accordingly, the charge mix ratio would change from the normal 70/30 ratio of hot metal/scrap to a new level of 68/32. To accomplish this minor alteration of the hot metal/scrap ratio would require the consumption of fossil fuel equivalent to that of 200 cu. ft. of natural gas plus 400 cu. ft. additional oxygen per ton of raw steel produced.

DESCRIPTION OF THE INVENTION

The properties of molten iron offer an excellent opportunity to increase the scrap melting capability of basic oxygen furnaces and at the same time decrease the consumption of oxygen, burnt lime and dolomite, and fluorspar, shorten the processing time and increase the yield of raw steel. Further, the temperature of molten pig iron has a profound effect on the hot metal/scrap ratio and the consumption of other ingredients and thereby substantially influences both the cost and quantity of raw steel produced by basic oxygen furnaces. For example, since molten pig iron is the major component of the charge and has a higher specific heat than scrap, it is only necessary to increase the temperature of the hot metal by 150° F. to accomplish an increase of 100 lbs. of scrap in the charge mixture.

The operators of basic oxygen furnaces have, however, lacked, any satisfactory means by which the temperature of hot metal could be controlled or altered to a desired level for the purpose of optimizing the charge mix either to obtain maximum steel production or to influence production costs by advantageous increase in the use of the lowest cost metallic materials whether they be hot metal, scrap or iron oxides.

According to the present invention however, it has been found that the relative proportions of scrap metal used in the production of steel using a basic oxygen furnace can be economically and substantially increased by super heating the molten pig iron prior to its introduction into the basic oxygen furnace.

Generally the temperature of molten pig iron prior to introduction into a furnace is about 2200° to 2500° F, with 2400° F. being a typical value. In accordance with the present invention, the temperature of the molten pig iron is raised by at least an additional 100° F or more and preferably at least 400° F.–600° F. before the molten metal is introduced into the basic oxygen furnace. Therefore the present invention contemplates that the molten pig iron will be raised to a temperature, for example, of about 2600° F. to 3000° F. and preferably about 2800° to 3000° F. prior to introduction into the steel making furnace.

An example of the influence of superheated hot metal on altering the hot metal/scrap ratio and on decreasing the use of oxygen and fluxes per ton of raw steel produced is shown in the following table:

| Charge Mix to BOF | SUPERHEAT ABOVE 2400° F BASE | | | | | | |
|---|---|---|---|---|---|---|---|
| | 2400° F | 100° F | 200° F | 300° F | 400° F | 500° F | 600° F |
| % Hot Metal | 70.4 | 68.7 | 67.2 | 65.7 | 64.2 | 62.9 | 61.5 |
| % Scrap | 29.6 | 31.3 | 32.8 | 34.3 | 35.8 | 37.1 | 38.5 |
| Yield % | 87.0 | 87.2 | 87.4 | 87.5 | 87.7 | 87.9 | 88.0 |
| Other Materials Per Ton of Steel | | | | | | | |
| Oxygen, cu. ft. | 1739 | 1695 | 1653 | 1613 | 1574 | 1538 | 1503 |
| Burnt Lime, lb. | 137 | 134 | 130 | 127 | 124 | 121 | 118 |
| Dolomite, lb. | 49 | 48 | 47 | 46 | 45 | 44 | 43 |
| Fluorspar, lb. | 6.1 | 5.9 | 5.8 | 5.6 | 5.5 | 5.4 | 5.2 |
| Other Fluxes, lb. | 7.6 | 7.4 | 7.2 | 7.0 | 6.9 | 6.7 | 6.5 |
| Power Required For Superheating Hot Metal, Kwh/Ton Steel | — | 11 | 22 | 32 | 41 | 50 | 59 |

The foregoing tabulation shows that superheating of hot metal has a profound effect on the hot metal/scrap ratio and is substantially more effective than any other method employed for increasing scrap consumption by basic oxygen furnaces.

Any suitable device or furnace can be used for superheating the hot metal prior to charging it into a basic oxygen furnace. Moreover, the potential for increasing scrap consumption by the basic oxygen furnace would be the same regardless of the device used for superheating provided the superheating device did not alter the initial composition of the hot metal.

In the past, however, the impracticability and inefficiency of heating hot metal by combustion of fossil fuels or in electric arc furnaces has dissuaded attempts to superheat metals.

Therefore, a preferred device for superheating hot metal is the induction furnace, and particularly a channel type furnace. Suitable induction furnaces and their operation for heating metals are, for example, described in U.S. Pat. No. 3,595,979 to Shearman and U.S. Pat. No. 3,092,682 to Tama et al.

The advantage of the induction furnace is that it can rapidly increase the temperature of the hot metal without altering in any way the composition of the hot metal. High powered channel inductors are now available and provide a vigorous stirring of molten metal and with a power consumption of only 12–14 Kwh per ton while raising the temperature of the metal by 100° F. A horizontal, cylindrical type furnace, somewhat similar in appearance to a hot metal mixer, can be equipped with several individual inductors to accomplish any desired degree of superheating within a cycle time matching that of the basic oxygen furnace, and for any quantity of hot metal demanded by the basic oxygen furnace. Since a channel type induction furnace is preferably operated on a dominant pool in practice the holding capacity of the induction superheater furnace should be not less than twice the cyclical batch of hot metal demanded by the basic oxygen furnace.

Although not restrictive, an induction superheater equipped with the number of inductors required to provide 100 Kw per ton of each batch of hot metal would raise the temperature of the hot metal at the rate of 12° F per minute and thereby would superheat each batch of hot metal by 500° F in a cycle time of less than 42 minutes. Power capacities greater or less than 100 Kw per ton can be used if desired to match faster or slower cycle times of demand for hot metal by the basic oxygen furnace.

If price relationships between hot metal/scrap and iron oxides dictate an economic advantage by using iron oxides rather than extra scrap for thermal adjustment within the basic oxygen furnace, the superheating of hot metal would again be an effective method for augmenting steel production while minimizing the composite cost of the metallic charge materials. However, in using iron oxides as a coolant in the basic oxygen process, it is necessary to recognize that, on the basic of contained metallics, iron oxides have slightly more than four times the cooling effect of an equal weight of steel scrap. Accordingly, superheating one ton of hot metal by 100° F will provide enough heat to decompose and melt only 16 lb. of iron contained in iron oxide ore, sinter, or pellets, compared with 68 lb. of scrap melting capacity for each 100° F superheat of hot metal.

At the time molten pig iron, and particularly those with a low content of phosphorus, are discharged from a blast furnace they characteristically are saturated with an amount of dissolved carbon governed by the temperature of the molten metal. Subsequent handling and transportation unavoidably cools the molten metal and therewith lowers the solubility of carbon in the iron. The carbon thus rejected from the molten metal is known as kish and will be found on the surface of the molten metal or will float into the surrounding atmosphere. This loss of carbon from molten pig iron during cooling not only creates a nuisance and pollution but, also, decreases the scrap melting potential of the molten iron when it is refined with oxygen in the basic oxygen furnace. Lowering the temperature of molten blast furnace iron by 100° F will cause the molten iron to reject 0.14 percent carbon as kish and this carbon loss corresponds to decrease in thermochemical energy of the molten iron amounting to sufficient heat to melt 15 lb of scrap per ton of molten iron. Whenever operators of basic oxygen furnaces are able to accommodate the nuisance and pollution created by kish, the hot metal superheater can be used to again re-saturate the molten iron with carbon by appropriate additions of carbonaceous materials to the superheater amounting to 0.14 percent increase in carbon content of the molten metal for each 100° F temperature rise in the superheater. This practice would again cause a small amount of kish to be evolved from the molten metal when the metal is discharged from the superheater and transferred to the basic oxygen furnace. However, re-saturation of the molten iron with carbon will provide enough chemical heat to melt an additional 15 lb. of scrap per ton of molten iron for each 100° F temperature rise in the superheater. Thus the combination of the 15 lb. of scrap melting contributed by carbon resaturation plus 68 lb. of scrap melting per ton of hot metal arising from each 100° F superheat applied to the hot metal would give to the basic oxygen furnace a total increase in scrap melting capability of 83 lb. of scrap per ton of hot metal used in the charge for each 100° F superheat applied to the hot metal. As an example, with a superheat of 500° F accompanied by carbon re-saturation of the hot metal the charge mix to the basic oxygen furnace would be 61 percent and 39 percent scrap to maintain the same thermal balance during oxygen refining as is commonly attained with a charge mix of 70/30 hot metal to scrap.

I claim:

1. A method for producing steel in oxygen converter whereby the relative proportion of scrap metal used is increased which comprises charging scrap metal into said converter, superheating molten iron in a separate vessel to a temperature of 2600° to 3000° F without altering the initial composition of the molten iron, and then charging said superheated molten iron into said scrap containing converter, followed by the injection of gaseous oxygen and fluxes to obtain a steel product of desired composition.

2. The method of claim 1 wherein said superheated hot metal is used to remelt additional cold pig iron thereby supplementing the quantity of new molten pig iron and minimizing the use of such new molten iron in the basic oxygen furnace.

3. The method of claim 1 wherein said molten iron is recarburized subsequent to superheating to essentially the level of maximum carbon solubility of the superheated metal.

4. The method of claim 1 wherein said superheating is carried out using an induction type furnace.

5. The method of claim 1 wherein said superheating is to a temperature of 2800° to 3000° F.

* * * * *